US012743283B2

(12) United States Patent
Haryadi et al.

(10) Patent No.: US 12,743,283 B2
(45) **Date of Patent: *Sep. 22, 2026**

(54) UNIFIED BOOT IMAGE FOR MULTIPLE OPERATING SYSTEMS

(71) Applicant: VMware LLC, Palo Alto, CA (US)

(72) Inventors: Aravinda Haryadi, Bangalore (IN); Karthik Ramachandra, Bangalore (IN); Suman Boro, Bangalore (IN)

(73) Assignee: VMware LLC, Palo Alto, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 18/745,951

(22) Filed: Jun. 17, 2024

(65) Prior Publication Data

US 2024/0385847 A1 Nov. 21, 2024

Related U.S. Application Data

(63) Continuation of application No. 17/962,619, filed on Oct. 10, 2022, now Pat. No. 12,014,185.

(30) Foreign Application Priority Data

Jul. 19, 2022 (IN) ............................ 202241041222

(51) Int. Cl.

*G06F 15/177* (2006.01)
*G06F 9/4401* (2018.01)
*G06F 9/455* (2018.01)

(52) U.S. Cl.

CPC ........ *G06F 9/4401* (2013.01); *G06F 9/45558* (2013.01); *G06F 2009/4557* (2013.01)

(58) Field of Classification Search

CPC ............... G06F 9/4401; G06F 9/45558; G06F 2009/4557; G06F 2009/45562; G06F 8/63

(Continued)

(56) References Cited

U.S. PATENT DOCUMENTS 10,019,252 B1 * 7/2018 Cui ...................... G06F 9/4401
12,014,185 B2 6/2024 Haryadi et al.

(Continued)

OTHER PUBLICATIONS

U.S. Appl. No. 17/962,619, Non-Provisional Application filed Oct. 10, 2022, 32 pages.

(Continued)

*Primary Examiner* — Volvick Derose
(74) *Attorney, Agent, or Firm* — King Intellectual Asset Management

(57) ABSTRACT

Disclosed are various embodiments for a unified boot image that can be used to install an operating system onto a host machine and a respective operating system onto a data processing units (DPU) installed on a host machine. The unified boot image contains installation files for installing an operating system on the host machine and an installation depot that can be used to create a boot image for installing the same or different operating system on the DPU. During installation of an operating system on a host machine the installation workflow can also require installation of an additional operating system or other configuration of a DPU installed in a host machine. In response to determining that an operating system is to be installed on the DPU, the installation depot can be obtained and reformatted into a downloadable format that is compatible with the DPU.

20 Claims, 4 Drawing Sheets

(58) Field of Classification Search
USPC .............................................................. 713/2
See application file for complete search history.

(56) References Cited

U.S. PATENT DOCUMENTS

| | | | | |
|---|---|---|---|---|
| 2006/0167868 | A1* | 7/2006 | Zhang | G06F 8/61 |
| 2010/0115257 | A1* | 5/2010 | Hoang | G06F 11/1666<br>717/174 |
| 2011/0099423 | A1* | 4/2011 | Chen | G06F 11/2289<br>714/25 |
| 2012/0278802 | A1* | 11/2012 | Nilakantan | G06F 9/45558<br>718/1 |
| 2017/0024224 | A1* | 1/2017 | Bakke | G06F 9/4416 |
| 2020/0241889 | A1* | 7/2020 | Ulaganathan | G06F 9/4406 |
| 2020/0257814 | A1* | 8/2020 | El-Moussa | G06F 21/6218 |
| 2021/0034401 | A1* | 2/2021 | Kletzander | G06F 9/4843 |
| 2021/0326150 | A1* | 10/2021 | Raayman | H04L 61/5014 |

OTHER PUBLICATIONS

U.S. Appl. No. 17/962,619, Notice of Allowance dated Feb. 5, 2024, 48 pages.

* cited by examiner

UNIFIED BOOT IMAGE FOR MULTIPLE OPERATING SYSTEMS

CROSS-REFERENCES TO RELATED APPLICATIONS

This application is a continuation of U.S. patent application Ser. No. 17/962,619, filed Oct. 10, 2022, by Haryadi et al. and issued as U.S. Pat. No. 12,014,185, which claims the benefit, under 35 U.S.C. 119(a)-(d) to Indian Application Serial No. 202241041222, filed in India entitled "UNIFIED BOOT IMAGE FOR MULTIPLE OPERATING SYSTEMS", on Jul. 19, 2022, by VMware, Inc., the entirety of each of which is incorporated herein by reference for all purposes.

BACKGROUND

Modern computing devices often have dedicated offload cards installed in order to improve the performance or throughput for various tasks. These offload cards can be quite sophisticated, with their own processors, memory, and operating system. The installation of an operating system or firmware on the offload cards is often done when the operating system on the host machine is also installed. For example, an installer process on the host machine can provision the offload cards as a part of an installation flow where configuration of the host machine is completed and where other hardware and software components on the host machine are configured or installed. Sometimes the operating system that is compatible with the host machine may differs from the operating system that is compatible with the offload cards. As such, multiple boot images may be required to support both the host machine and the offload cards.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to a unified boot image that can be used to install an operating system onto a host machine and a respective operating system onto one or more data processing units (DPUs) installed on a host machine A DPU can be an offload card or a smart network interface card installed on a host machine and can have its own CPU and other resources that require provisioning, in addition to the provisioning of the host machine During installation of an operating system on a host machine the installation workflow can also require installation of an additional operating system or other configuration of a DPU installed in a host machine Since the type of operating system as well as the type of hardware architecture (e.g., ARM, x86, etc.) may differ between the host machine and the DPU, different boot images are typically required for the host machine and the DPU during the lifecycle of the respective operating systems.

To resolve these issues, the various embodiments of the present disclosure correspond to a single unified boot image that can be used for operating system provisioning and lifecycle management for both the host machine and DPUs installed on the host machine. In various examples, the single unified boot image comprises both the files required for installing an operating system on the host machine and an installation depot that can be used to create a boot image for installing the same or different operating system on DPU's installed in the host machine By providing a unified boot image, customers are no longer required to download multiple images and the difficulty of maintaining the interoperability matrix between the different images is removed. Further, the single unified boot image is configured to allow prior deployments of the host machine operating system to continue to work as-is. In various examples, the single unified boot image can be used to install either or both the operating system on the host machine and the operating system on the DPU, as necessary.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
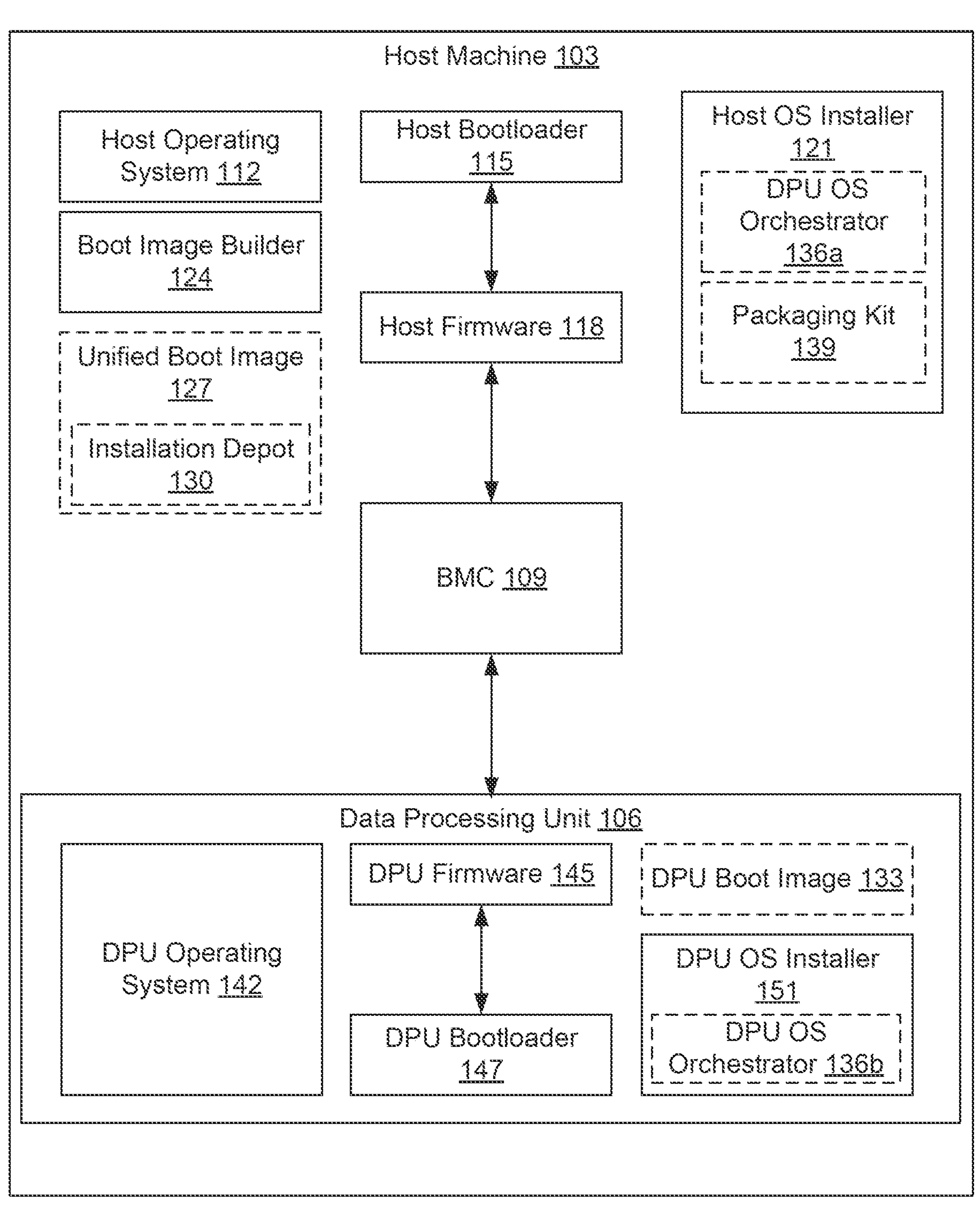
FIG. 1 is a drawing depicting a host machine according to various embodiments of the present disclosure.

FIG. 1 depicts a host machine 103 according to various embodiments of the present disclosure. The host machine 103 can include one or more processors, a memory, and/or a network interface. The host machine 103 can also include a data processing unit (DPU) 106 and a baseboard management controller (BMC) 109. The host machine 103 can be used to execute various applications or provide various computational resources to third-parties. For example, the host machine 103 could be configured to execute a hypervisor, which could facilitate the execution of one or more guest machines on the host machine 103. Accordingly, in various embodiments, the host machine 103 could execute a host operating system 112, a host bootloader 115, host firmware 118, a host operating system (OS) installer 121, and/or a boot image builder 124.

The host operating system 112 can include any system software that manages the operation of computer hardware and software resources of the host machine 103. The host operating system 112 can also provide various services or functions to computer programs that are executed by the host machine 103. For example, the host operating system 112 may schedule the operation of tasks or processes by the processor of the host machine 103. The host operating system 112 may also provide virtual memory management functions to allow processes executing on the host machine 103 to have their own respective logical or virtual address spaces, which the host operating system 112 can map to physical addresses in the memory of the host machine 103. When referring to the host operating system 112, the host operating system 112 can include both hypervisors and/or any other system software that manages computer hardware and software resources.

The host bootloader 115 can represent a program responsible for booting the host operating system 112 in response to the host machine 103 being powered on. Once execution of the host bootloader 115 is initiated, the bootloader can select the unified boot image 127 to boot the host operating system 112. In some examples, the host bootloader 115 can select an alternative boot image to select in the event that the unified boot image 127 is inoperative or defective. The host bootloader 115 can make such a determination by detecting that the operating system 112 of the host machine 103 fails to return a success signal upon bootup.

The unified boot image 127 represents a disk image containing a copy of the current version of the host operating system 112 to be executed by the host machine 103. The unified boot image 127 can also include configuration information and state information, such as whether the most recent boot using the unified boot image 127 had failed. In addition, the unified boot image 127 comprises file for access to an installation depot 130. The installation depot 130 corresponds to an offline depot that includes the binaries associated with the operating system to be installed on the DPU 106. In various examples, the binaries of the operating system to be installed on the DPU 106 can be packaged in the unified boot image 127 as an offline depot in .zip format which can be converted on demand to any image format (e.g., ISO, DD, PXE), as defined by the DPU capabilities. According to various examples, the installation depot 130 can be identified in the unified boot image 127 according to the file name. For example, the unified boot image 127 can include a .tgz file that can be read and extracted by the DPU OS orchestrator **136*a* to a predefined location on disk to reveal the .zip offline depot. In one example, the operating system included in the unified boot image 127 that may be used in an embodiment described herein is a VMware® ESXi hypervisor provided as part of the VMware vSphere® solution. In another example, the installation depot 130** may correspond to binaries associated with a VMware® ESXio hypervisor provided as part of the VMware vSphere® solution.

Examples of the disclosure can allow the host OS installer 121 to install a fresh operating system or an updated operating system onto the host machine 103 and generate a DPU boot image 133 using the installation depot 130 in the unified boot image 127. A user can initiate provisioning of the host machine 103 to install software on the device, such as a bare-metal hypervisor that allows the host machine 103 to execute virtual machines that can support workloads such as virtual desktop infrastructure, server infrastructure, datacenter operations, or any other workloads needed by a customer provisioning the host machine 103. The host machine 103 can represent a server that is being provisioned for an enterprise.

The host OS installer 121 can be executed to orchestrate the installation process. In particular, the host OS installer 121 can oversee installation of a unified boot image 123 on the host machine 103. The host OS installer 121 can also oversee provisioning of one or more DPUs 106 of the host machine 103. The host OS installer 121 represents a process or application that can facilitate installation of software on the host machine 103. The host OS installer 121 can also create the DPU boot image 133 from the unified boot image 127. The DPU boot image 133 can be used by a DPU 106 to install or provision the DPU operating system 142 on the DPU 106.

During the installation process, the host OS installer 121 can identify an installed DPU 106 and determine whether an operating system is to be provisioned for a DPU 106 installed on the host machine 103. For example, the installation process can generate user interface that allows a user to select a DPU 106 to provision and provide any configuration data that may be necessary for a given DPU installation.

In various examples, upon determining that an operating system is to be provisioned for a given DPU 106, the host OS installer 121 can execute a DPU OS orchestrator **136*a* to create a DPU boot image 133 using the installation depot 130 accessed from the unified boot image 127. For example, the DPU OS orchestrator 136*a* can identify the associated file in the unified boot image 127 that corresponds to the operating system associated with the DPU 106. According to various examples, the installation depot 130 can be identified in the unified boot image 127 according to the file extension. For example, the unified boot image 127 can include a .tgz file that can be read and extracted by the DPU OS orchestrator 136*a*** to a predefined location on disk to reveal the .zip offline depot.

Upon accessing the installation depot 130, the DPU OS orchestrator **136*a* can reformat the installation depot 130 using the packaging kit 139 to create the DPU boot image 133 that is in a downloadable format (e.g., ISO, DD, PXE) as defined by the DPU capabilities. In various examples, the packaging kit 139 can comprise one or more predefined scripts configured to format the corresponding binaries included in the installation depot 130 into a type of format that is compatible with the DPU capabilities. In various examples, the DPU OS orchestrator 136 embeds a configuration file including various configuration data in the DPU boot image 133. In various examples, the configuration data can be user defined and correspond to user inputs received during the installation workflow executed by the host OS installer 121**.

In various examples, the DPU OS orchestrator **136*a* can initiate a server process to host the created DPU boot image 133. The server process can be running on the host machine 103, and the DPU 106 can communicate with the server process using a network stack that is available to the DPU 106. The BMC 109 can provide the ability for the DPU 106 and the host machine 103 to communicate using a network stack. In various examples, the DPU OS orchestrator 136*a* can monitor the install of the DPU operating system 142 by the DPU OS installer 151 and report any updates to a user. For example, the DPU OS orchestrator 136*a* can receive updates associated with the install via interactions with the BMC 109**.

The host firmware 118 can include software embedded in the host machine 103 to provide a standardized operating environment for more complex software executing on the host machine 103. For example, the PC-compatible Basic Input/Output System (PC-BIOS) used by many desktops, laptops, and servers initializes and tests system hardware components, enables or disables hardware functions as specified in the PC-BIOS configuration, and the loads the host bootloader 115 from memory to initialize the host operating system 112 of the host machine 103. The PC-BIOS also provides a hardware abstraction layer (HAL) for keyboard, display, and other input/output devices which may be used by the host operating system 112 of the host machine 103. The Unified Extensible Firmware Interface (UEFI) provides similar functions as the BIOS as well as various additional functions such as Secure Boot, a shell environment for interacting with the host machine 103, network connectivity for the host machine 103, and various other functions.

In one or more examples, a host machine 103 can correspond to a build host machine that is configured to build the unified boot image 127. The boot image builder 124 can be executed to build the unified boot image 127 according to various embodiments. In various examples, the boot image builder 124 can spawn a DPU OS build on another build host machine 103. As such, the second build host machine 103 can build the installation depot 130 associated with the DPU operating system 142 that is to be included in the unified boot image 127. While the second host build host machine 103 is building the installation depot 130 and the corresponding binaries associated with the DPU operating system 142, the boot image builder 124 of the host machine 103 can begin building the binaries and associated files for the host operating system 112. Once DPU OS build is complete and the host OS build is complete, the boot image builder 124 fetches the binaries and the installation depot 130 from the second host machine 103 and builds the unified boot image 127 using the components, binaries, and installation depot 130 associated with both the DPU OS build and the host OS build.

The DPU 106 can represent an offload card installed on the host machine 103 to accelerate the processing of various types of compute workloads. Accordingly, the DPU 106 can include at least one processor, memory, and (in some implementations), one or more network interfaces. DPUs 106 can be used, for example, to accelerate network packet processing (e.g., for a firewall, software defined switch, etc.), input/output operations for local or network storage, or other computational workloads. In other instances, the DPU 106 can be used to execute applications that would typically be executed by the central processor unit (CPU) of the host machine 103, to make the resources of the CPU of the host machine 103 available for other tasks. For example, the DPU 106 could execute a hypervisor so that the resources of the CPU of the host machine 103 could be fully dedicated to the guests executing on the host machine 103. Accordingly, in various embodiments, the DPU 106 could execute a DPU operating system 142, a DPU firmware 145, a DPU bootloader 147, and/or a DPU OS installer 151.

The DPU operating system 142 can include any system software that manages the operation of computer hardware and software resources of the DPU 106. The DPU operating system 142 can also provide various services or functions to computer programs that are executed by the DPU 106. For example, the DPU operating system 142 may schedule the operation of tasks or processes by the processor of the DPU 106. This could include network packet processing, network packet processing (e.g., for a firewall, software defined switch, etc.), input/output operations for local or network storage, or other computational workloads.

In implementations where the functionality of a hypervisor is implemented by the DPU 106, the DPU operating system 142 may also provide virtual memory management functions to allow processes executing on the host machine 103 to have its own logical or virtual address space, which the DPU operating system 142 can map to physical addresses in the memory of the host machine 103. When referring to the DPU operating system 142, the DPU operating system 142 can include both hypervisors and/or any other system software that manages computer hardware and software resources.

The DPU firmware 145 can include software embedded in the DPU 106 to provide a standardized operating environment for more complex software executing on the DPU 106. For example, the PC-compatible Basic Input/Output System (PC-BIOS) used by many desktops, laptops, and servers initializes and tests system hardware components, enables or disables hardware functions as specified in the PC-BIOS configuration, and the loads the DPU bootloader 147 from memory to initialize the DPU operating system 142 of the DPU 106. The PC-BIOS also provides a hardware abstraction layer (HAL) for keyboard, display, and other input/output devices which may be used by the DPU operating system 142 of the DPU 106. The Unified Extensible Firmware Interface (UEFI) provides similar functions as the BIOS as well as various additional functions such as Secure Boot, a shell environment for interacting with the DPU 106, network connectivity for the DPU 106, and various other functions.

The DPU bootloader 147 can represent a program responsible for booting the DPU operating system 142 in response to the DPU 106 being powered on. Once execution of the DPU bootloader 147 is initiated, the bootloader can select the DPU boot image 133 to boot the DPU operating system 142.

The DPU boot image 133 represents a disk image containing a copy of the current version of the DPU operating system 142 to be executed by the DPU 106. The DPU boot image 133 can also include configuration information and state information, such as whether the most recent boot using the DPU boot image 133 had failed.

The DPU OS installer 151 manages the installation process of a DPU boot image 133 on a DPU 106. In one example, the DPU OS orchestrator **136*a* associated with the host OS installer 121 can create and provide the DPU boot image 133 that can be installed by the DPU OS orchestrator 136*b* of the DPU OS installer 151, DPU bootloader 147, or another process on the DPU 106**.

The DPU OS orchestrator **136*a* associated with the host OS installer 121 can execute a server process from which the DPU 106 and/or BMC 109 can retrieve the DPU boot image 133 when the host machine 103 is being provisioned and/or when the DPU 106 is to be provisioned. The server process can represent an HTTP server, an FTP server, or any other server that supports file transfer between network nodes. The DPU OS orchestrator 136*b* can initiate a process to install or otherwise update the DPU operating system 142 based at least in part on the DPU boot image 133 comprising the DPU operating system 142 and corresponding configuration data. In addition, the DPU OS orchestrator 136*b* can provide install updates to the DPU OS orchestrator 136*b* via the communication established via the BMC 109**.

The BMC 109 represents a specialized microcontroller embedded on the motherboard of the host machine 103 that provides an interface between system management software (such as the host operating system 112 or host firmware 118) and the hardware of the host machine 103. This can include, for example, providing a serial console over a network connection or other out of band communications and control mechanisms for the host machine 103. The BMC 109 can also provide out of band communications channels between hardware components of the host machine 103, such as between the DPU 106 and other components of the host machine 103. In some implementations, the BMC 109 can include its own memory, processor, and optimized embedded firmware.

Figure 2:
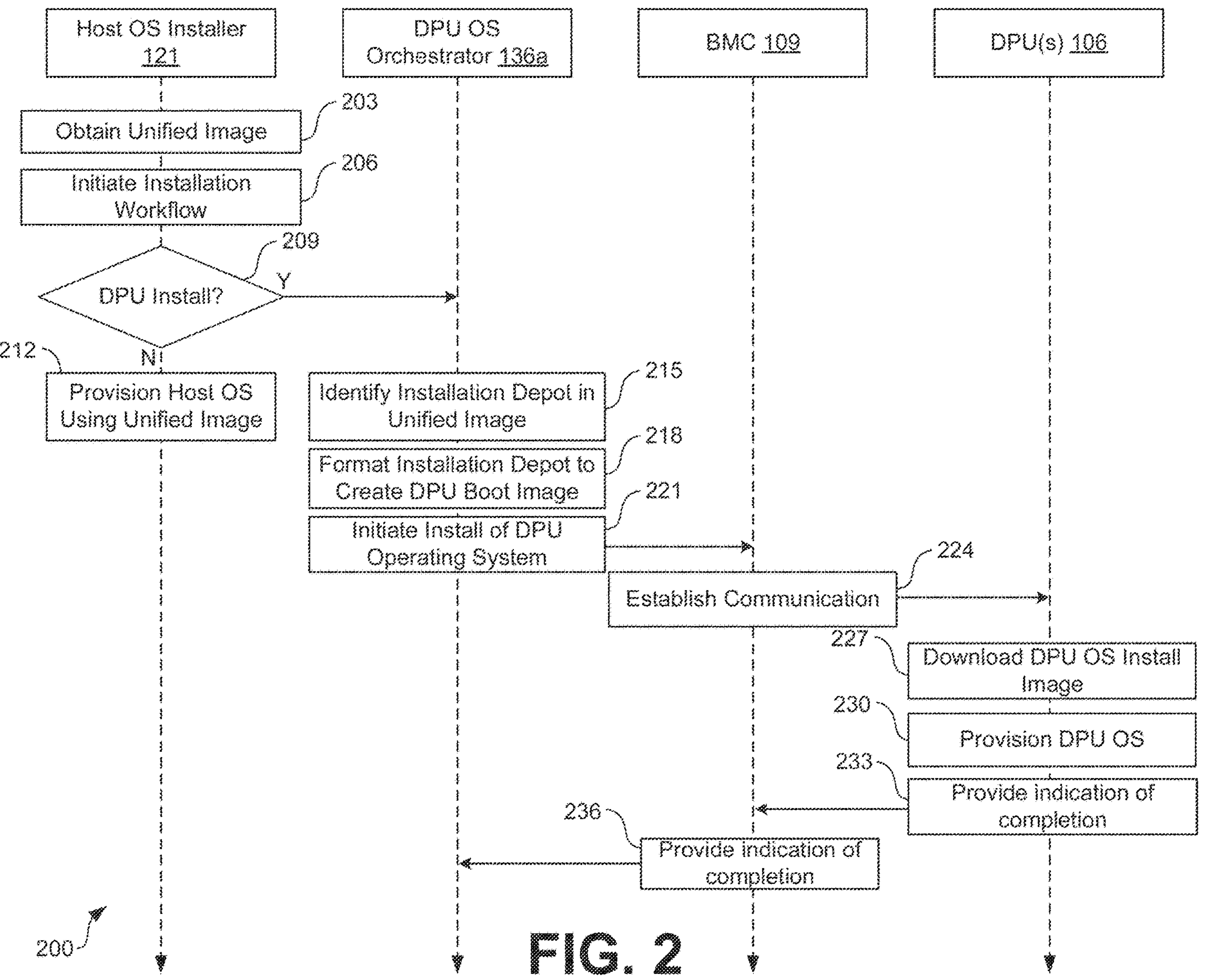
FIG. 2 is a sequence diagram illustrating the interactions between the components of the host machine of FIG. 1 according to various embodiments of the present disclosure.

Referring next to FIG. 2, shown is a sequence diagram that provides one example of the interactions between the components of the host machine 103. The sequence diagram of FIG. 2 provides merely an example of the many different types of interactions between the components of the host machine 103 according to the various embodiments of the present disclosure. As an alternative, the sequence diagram of FIG. 2 can be viewed as depicting an example of elements of a method implemented within the host machine 103. As a result of the process depicted in FIG. 2, the host operating system 112 and the DPU operating system 142 can be provisioned or installed on the host machine 103.

Beginning with block 203, the host OS installer 121 obtains the unified boot image 127 that can be used for provisioning the host operating system 112 on the host machine 103 and provisioning the DPU operating system 142 on the DPU installed on the host machine 103. In some examples, the unified boot image 127 is obtained from a memory in the host machine 103. In other examples, the unified boot image 127 is obtained by downloading the unified boot image 127 from a provider server. The host OS installer 121 can implement an installation workflow that installs a new operating system on the host machine 103, such as a bare metal hypervisor that can provide virtual machine capabilities to the host machine 103.

At step 206, the host OS installer 121 can initiate the installation workflow for provisioning the host operating system 112 and/or the DPU operating system 142 on the host machine 103 and/or DPU 106 according to the unified boot image 127. In various examples, the host OS installer 121 can render an installation user interface on a display device of the host machine 103. The installation user interface can be used to walk a user through the installation process for the host operating system 112 and/or the DPU operating system 142. In various examples, a user can provide credentials and configuration inputs that can be applied to the host operating system 112 and/or the DPU operating system 142.

At step 209, the host OS installer 121 determines whether a DPU has been selected for an operating system installation. In various examples, the host OS installer 121 can identify the presence of a DPU and indicate the presence of the DPU 106 to a user via the installation user interface. In this example, a user can select the DPU 106 for installation of the DPU operating system 142, if desired. In some examples, the user can request specific details associated with the DPU 106 such as, for example, a DPU vendor name, a model name, a serial number, a PCI identifier, a name of a currently running operating system, a version of the current operating system, a unique identifier, and/or other details. A user can use this information to make a decision on whether to install an operating system associated with the unified boot image 127 on the DPU 106.

If a DPU 106 is not selected, the host OS installer 121 proceeds to step 212 and continues with provisioning the host operating system 112 using the unified boot image 127. If a DPU 106 is selected for install, the host OS installer 121 executes the DPU OS orchestrator **136*a* and proceeds to step 215. It should be noted that if the host operating system 112 is to be provisioned along with the DPU operating system 142, the host OS installer 121 can continue with provisioning the host operating system 112 independent of the installation workflow associated with the provisioning of the DPU operating system 142. In some examples, the host operating system 112 can be provisioned in parallel to the provisioning of the DPU operating system 142. In other examples, the host operating system 112 can be provisioned before or after the provisioning of the DPU operating system 142**.

At step 215, the DPU OS orchestrator **136*a* identifies the installation depot 130 included in the unified boot image 127. The installation depot 130 corresponds to an offline depot that includes the binaries associated with the operating system to be installed on the DPU 106. In various examples, the binaries of the operating system to be installed on the DPU 106 can be packaged in the unified boot image 127 as an offline depot in a compressed format (e.g., .zip). For example, the unified boot image 127 can identify a file with a given file name or file extension (e.g., .tgz) or other type of file extension that can be read and extracted by the DPU OS orchestrator 136*a*** to a predefined location on disk to reveal the compressed format offline depot.

At step 218, the DPU OS orchestrator **136*a* formats the installation depot 130 to create the DPU boot image 133. The DPU boot image 133 can represent an ISO image or an executable file in a format that is compatible with the DPU firmware 145 or the DPU bootloader 147 according to the particular specifications of the respective DPU 106. In various examples, the DPU OS orchestrator 136*a* can reformat the installation depot 130 using the packaging kit 139 to create the DPU boot image 133 that is in a downloadable format (e.g., ISO, DD, PXE) as defined by the DPU capabilities. In various examples, the packaging kit 139 can comprise one or more predefined scripts configured to format the corresponding binaries included in the installation depot 130 into a type of format that is compatible with the DPU capabilities. In various examples, the DPU OS orchestrator 136 embeds a configuration file including various configuration data in the DPU boot image 133. In various examples, the configuration data can be user defined and correspond to user inputs received during the installation workflow executed by the host OS installer 121**.

At step 221, the DPU OS orchestrator **136*a* initiates the install of the DPU operating system 142. In some examples, the DPU OS orchestrator 136*a* can initiate a server process to host the DPU boot image 133 created from the installation depot 130. The server process can be running on the host machine 103, and the DPU 106 can communicate with the server process using a network stack that is available to the DPU 106**.

At step 224, the BMC 109 provides the ability for the DPU 106 and the host machine 103 to communicate using a network stack. In this example, the DPU OS orchestrator **136*a* can provide the uniform resource locator (URL) or network address of the server process to the BMC 109. The BMC 109 can provide a networking stack or networking capability to the DPU 106 so that the host machine 103 and the DPU 106** can communicate using networking protocols.

At step 227, the DPU 106 downloads the DPU boot image 133 provided by the server process created by the DPU OS orchestrator **136*a*. The DPU boot image 133 can represent an installation image that can be installed by the DPU OS installer 151 or another provisioning service on the DPU 106, such as a process provided by the DPU firmware 145 to install an operating system on the DPU 106. The DPU boot image 133 can represent an ISO image or an executable file in a format that is compatible with the DPU firmware 118 or the DPU bootloader 147 according to the particular specifications of the respective DPU 106**.

At step 230, the DPU 106 executes the DPU OS installer 151 to initiate a DPU installation workflow. The DPU OS installer 151 can represent an installer that installs and configures an DPU operating system 142 onto the DPU 106. The DPU operating system 142 can execute the installer workflow so that the installer can install a bare metal hypervisor, a server operating system, a network stack, or any other software component or operating system onto the DPU 106 so that the DPU 106 can work with the host machine 103 to facilitate user workloads and other tasks. The DPU OS installer 151 can install a DPU boot image 133 onto the DPU 106 that the DPU bootloader 147 can boot whenever DPU 106 is powered up or rebooted.

At step 233, the DPU OS installer 151 provides an indication of completion to the BMC 109. For example, the DPU bootloader 147 can boot a DPU boot image when the installer workflow has completed so that the DPU 106 is powered on and begins to boot. The DPU operating system 142 can provide a success signal upon bootup of the DPU 106 if the DPU 106 successfully boots the DPU boot image 133.

However, if the DPU operating system 142 fails to successfully boot from the DPU boot image 133, then the DPU 106 may not provide an indication of completion to the BMC 109 at step 219. For example, the BMC 109 or DPU OS orchestrator 136 can determine after a timeout period that the DPU OS installer 151 did not successfully complete installation of the DPU operating system 142 from the DPU boot image 133. In this scenario, the BMC 109 or the DPU OS orchestrator 136 can determine that the DPU installer workflow was unsuccessful and take one or more remedial actions. In one example, the DPU OS orchestrator **136*b* can report the failure of the DPU installation workflow to the host OS installer 121 or a user monitoring the installation flow implemented by the host OS installer 121 so that the user can intervene. In another scenario, the host OS installer 121 can restart the DPU installation workflow on the DPU 106 or power cycling the DPU 106**.

The host OS installer 121 can determine whether the DPU operating system 142 has successfully booted by polling the BMC 109 to determine whether the DPU operating system 142 has sent a ready signal to the BMC 109. Failure to receive a ready signal from the DPU operating system 142 within a predefined time period could serve as an indicator that the DPU operating system 142 has failed to boot.

Next, at block 236, the BMC 109 provides the indication of completion of the DPU installation flow to the host OS installer 121. Thereafter, this portion of the process proceeds to completion.

Figure 3:
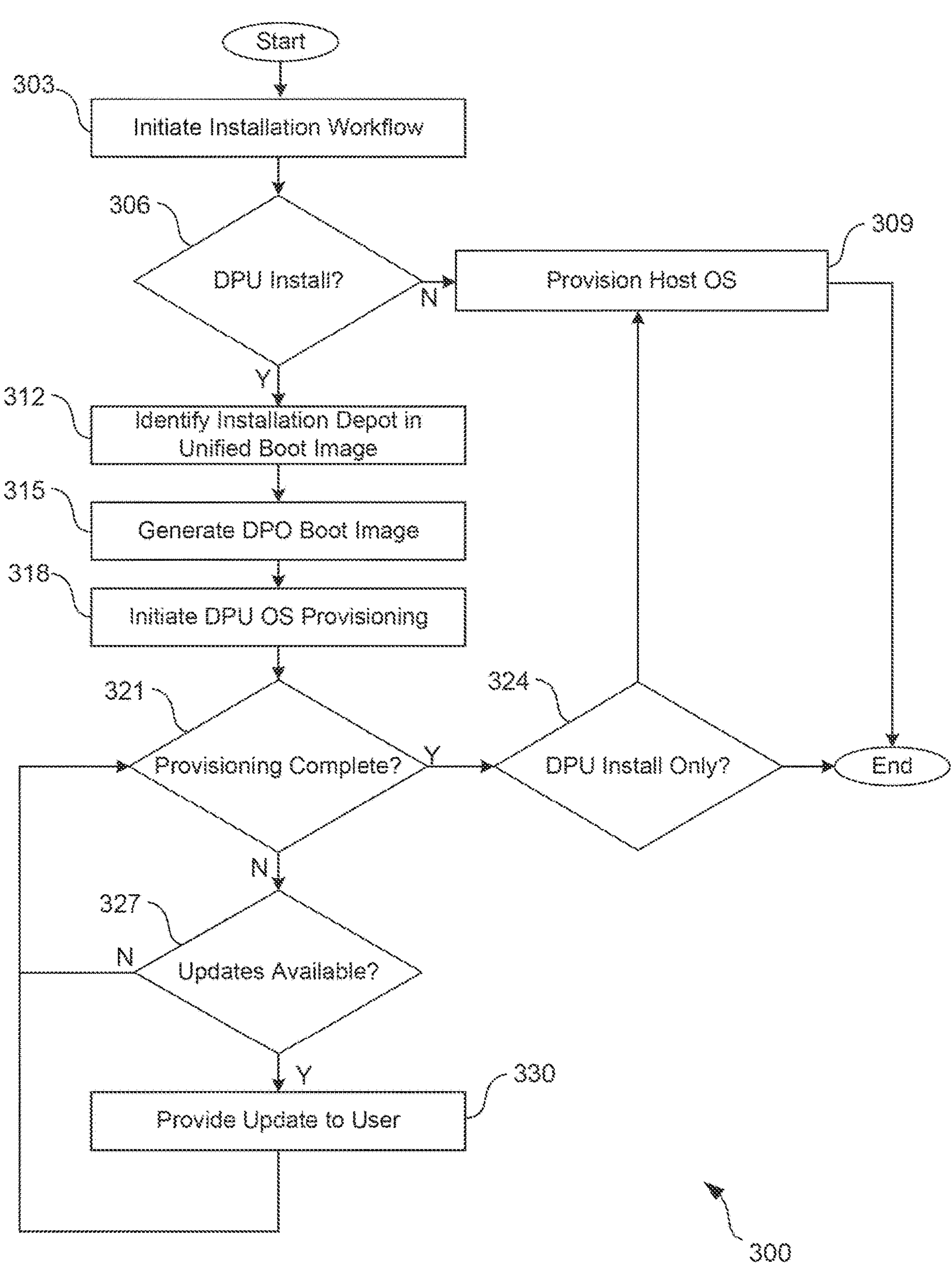
FIG. 3 is a flowchart illustrating an example workflow of a host operating system (OS) installer of the host machine of FIG. 1 according to various embodiments of the present disclosure.

Turning now to FIG. 3, shown is a flowchart showing an example operation of how the host OS installer 121 initiates an installation workflow for provisioning the host operating system 112 and/or the DPU operating system 142 using the unified boot image 127 according to various embodiments of the present disclosure.

At step 303, the host OS installer 121 initiates the installation workflow for provisioning the host operating system 112 and/or the DPU operating system 142 on the host machine 103 and/or DPU 106 according to the unified boot image 127. In various examples, the host OS installer 121 can render an installation user interface on a display device of the host machine 103. The installation user interface can be used to walk a user through the installation process for the host operating system 112 and/or the DPU operating system 142. In various examples, a user can provide credentials and configuration inputs that can be applied to the host operating system 112 and/or the DPU operating system 142.

At step 306, the host OS installer 121 determines whether a DPU has been selected for an operating system installation. In various examples, the host OS installer 121 can identify the presence of a DPU and indicate the presence of the DPU 106 to a user via the installation user interface. In this example, a user can select the DPU 106 for installation of the DPU operating system 142, if desired.

If a DPU 106 is not selected, the host OS installer 121 proceeds to step 309 and continues with provisioning the host operating system 112 using the unified boot image 127. If a DPU 106 is selected for install, the host OS installer 121 executes the DPU OS orchestrator **136*a* and proceeds to step 312**.

At step 312, the DPU OS orchestrator **136*a* of the host OS installer 121 identifies the installation depot 130 included in the unified boot image 127. The installation depot 130 corresponds to an offline depot that includes the binaries associated with the operating system to be installed on the DPU 106. In various examples, the binaries of the operating system to be installed on the DPU 106 can be packaged in the unified boot image 127 as an offline depot in .zip format. For example, the unified boot image 127 can identify a file with a given file name or file extension (e.g., .tgz) or other type of file extension that can be read and extracted by the DPU OS orchestrator 136*a*** to a predefined location on disk to reveal the .zip offline depot.

At step 315, the DPU OS orchestrator **136*a* of the host OS installer 121 generates the DPU boot image the installation depot 130 to create the DPU boot image 133. The DPU boot image 133 can represent an ISO image or an executable file in a format that is compatible with the DPU firmware 145 or the DPU bootloader 147 according to the particular specifications of the respective DPU 106. In various examples, the DPU OS orchestrator 136*a* can reformat the installation depot 130 using the packaging kit 139 to create the DPU boot image 133 that is in a downloadable format (e.g., ISO, DD, PXE) as defined by the DPU capabilities. In various examples, the packaging kit 139 can comprise one or more predefined scripts configured to format the corresponding binaries included in the installation depot 130 into a type of format that is compatible with the DPU capabilities. In various examples, the DPU OS orchestrator 136*a* embeds a configuration file including various configuration data in the DPU boot image 133. In various examples, the configuration data can be user defined and correspond to user inputs received during the installation workflow executed by the host OS installer 121**.

At step 318, the DPU OS orchestrator **136*a* of the host OS installer 121 initiates the provision of the DPU operating system 142. In some examples, the DPU OS orchestrator 136*a* can initiate a server process to host the DPU boot image 133 created from the installation depot 130. The server process can be running on the host machine 103, and the DPU 106 can communicate with the server process using a network stack that is available to the DPU 106. In turn, the DPU OS installer 151 of the DPU 106 can download the DPU boot image 133 and proceed with the installation of the DPU operating system 142 using the DPU boot image 133**.

At step 321, the DPU OS orchestrator **136*a* of the host OS installer 121 determines whether the provisioning of the DPU operating system 142. In various examples, the DPU OS orchestrator 136*a* can monitor the status of the installation task being performed by the DPU installer workflow. In particular, the DPU OS installer 151 can provide status updates to the BMC 109 which can be monitored by the DPU OS orchestrator 136*a*. If the status update obtained from the BMC 109 indicates that the provisioning is complete, the host OS installer 121 proceeds to step 324. Otherwise, the host OS installer 121 proceeds to step 327**.

At step 327, the DPU OS orchestrator **136*a* of the host OS installer 121 determines whether there are any other updates available associated with the installation task being performed by the DPU OS installer 151. If there are other updates obtained from the BMC 109, the DPU OS orchestrator 136*a* proceeds to step 330. Otherwise, the DPU OS orchestrator 136 returns to step 321**.

At step 330, the DPU OS orchestrator **136*a* provides an update to the user via the installation workflow user interface associated with the initiated installation workflow. For example, a status notification can be rendered on a display device associated with the host machine 103 to notify the user of the installation status of the DPU operating system 142**.

At step 324, the host OS installer 121 determines whether the installation workflow corresponds to the installation of the DPU operating system 142 only or if the host operating system 112 is to be provisioned as well. For example, a user can indicate through interactions with the installation workflow user interface that only the DPU operating system 142 is to be installed using the unified boot image 127 or that both the host operating system 112 and the DPU operating system are to be installed. If only the DPU operating system 142 is to be installed, this portion of the process proceeds to completion. Otherwise, the host OS installer 121 proceeds to step 309.

At step 309, the host OS installer 121 continues with provisioning the host operating system 112 using the unified boot image 127. It should be noted that, although the flowchart of FIG. 3 illustrates the provisioning of the host operating system 112 after the provisioning of the DPU operating system 142, if the host operating system 112 is to be provisioned along with the DPU operating system 142, the host OS installer 121 can continue with provisioning the host operating system 112 independent of the provisioning of the DPU operating system 142. In some examples, the host operating system 112 can be provisioned in parallel to the provisioning of the DPU operating system 142. In other examples, the host operating system 112 can be provisioned before or after the provisioning of the DPU operating system 142. Thereafter, this portion of the process proceeds to completion.

Figure 4:
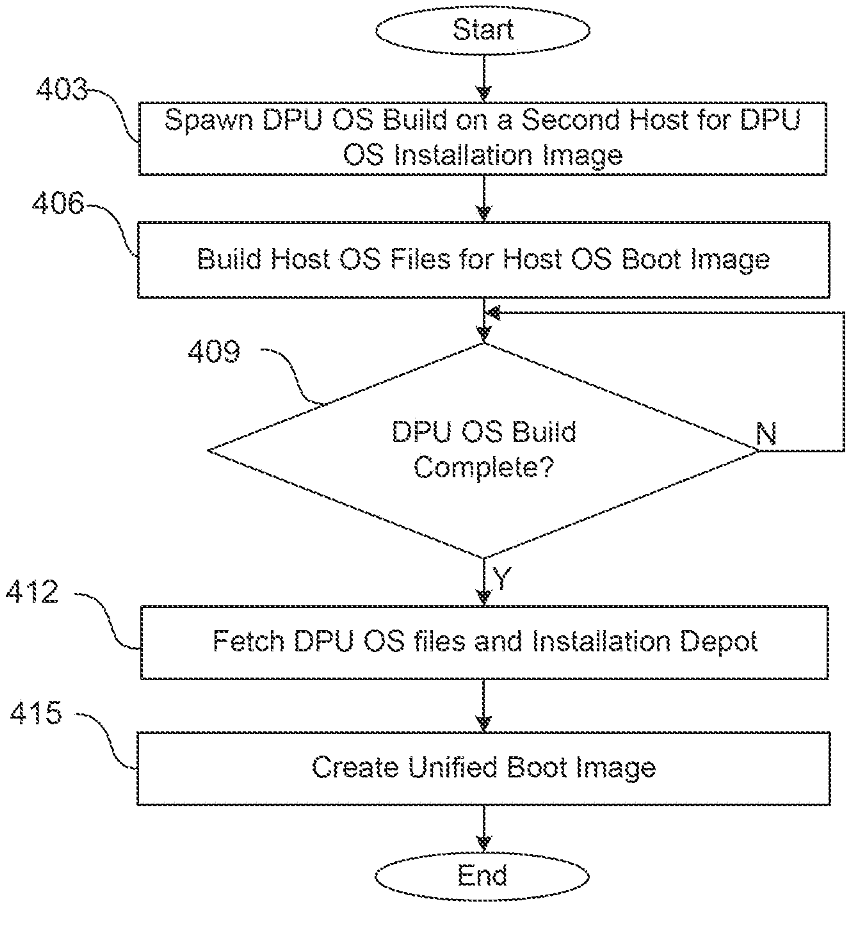
FIG. 4 is a flowchart illustrating an example workflow of a boot image builder of the host machine of FIG. 1 according to various embodiments of the present disclosure.

Turning now to FIG. 4, shown is a flowchart showing an example operation of how the boot image builder 124 building the unified boot image 127 according to various embodiments of the present disclosure.

At step 403, boot image builder 124 the boot image builder 124 spawns a DPU OS build process on a second build host machine 103. As a result, a boot image builder 124 on the second build host machine 103 builds the installation depot 130 associated with the DPU operating system 142 that is to be included in the unified boot image 127. In various examples, installation depot 130 contains the binaries and other components that can be used to create the DPU boot image 133. In various examples, the installation depot 130 is created in a compressed format (e.g., .zip).

At step 406, the boot image builder 124 initiates a host operating system build process and builds the binaries and components of the host operating system 112 that are to be including in the unified boot image 127 used to install or update the host operating system 112 on a host machine 103.

At step 409, the boot image builder 124 determines whether the DPU OS build process is complete. In particular, the boot image builder 124 can receive a status indication from the spawned DPU OS build process on the secondary build host machine. If the status indication indicates that the DPU OS build process is complete, the boot image builder 124 proceeds to step 412. Otherwise, the boot image builder 124 continues to wait at step 409.

At step 412, the boot image builder 124 fetches the binaries and the installation depot 130 from the second host machine 103. For example, the boot image builder 124 can send a request to the second host machine 103 for the build data associated with the DPU OS build.

At step 415, the boot image builder 124 builds the unified boot image 127 using the components, binaries, and installation depot 130 associated with both the DPU OS build and the host OS build. Thereafter, this portion of the process proceeds to completion.

Several software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

The invention claimed is:

1. A system, comprising:

a computing device comprising a central processor unit (CPU) and a data processing unit (DPU); and machine-readable instructions that, when executed by the CPU, cause the computing device to perform operations comprising:

obtaining, by the computing device, a first boot image comprising first installation data for configuring a first hypervisor on the computing device and second installation data for configuring a second hypervisor on the DPU;

identifying, by the computing device and from the second installation data, one or more files associated with the second hypervisor to be installed on the DPU;

creating, by the computing device, a second boot image based at least in part on the one or more files and an image format, the second boot image being a DPU boot image; and causing, by the computing device, the DPU to install the second hypervisor on the DPU using the DPU boot image.

2. The system of claim 1, the operations further comprising:

executing an installation workflow, based at least in part on the first installation data in the first boot image, to install the first hypervisor on the computing device.

3. The system of claim 1, the operations further comprising:

converting the one or more files into the DPU boot image having the image format by using a packaging kit.

4. The system of claim 1, wherein the DPU comprises at least one smart network interface card, the at least one smart network interface card comprising an additional CPU that can execute a storage task or a networking task on behalf of the CPU of the computing device.

5. The system of claim 1, wherein causing the DPU to install the second hypervisor comprises:

initiating communication with the DPU via a baseboard management controller (BMC); and providing the DPU boot image to the DPU via the BMC.

6. The system of claim 5, the operations further comprising:

monitoring a status of the second installation workflow via one or more status updates received from the BMC.

7. The system of claim 1, the operations further comprising:

receiving configuration data associated with installation of the second hypervisor, the DPU boot image being embedded with the configuration data.

8. A method, comprising:

obtaining, by a computing device, a first boot image comprising first installation data for configuring a first hypervisor on the computing device and second installation data for configuring a second hypervisor on a DPU;

identifying, by the computing device and from the second installation data, one or more files associated with the second hypervisor to be installed on the DPU;

creating, by the computing device, a second boot image based at least in part on the one or more files and an image format, the second boot image being a DPU boot image; and causing, by the computing device, the DPU to install the second hypervisor on the DPU using the DPU boot image.

9. The method of claim 8, further comprising:

executing an installation workflow, based at least in part on the first installation data in the first boot image, to install the first hypervisor on the computing device.

10. The method of claim 8, further comprising:

converting the one or more files into the DPU boot image having the image format by using a packaging kit.

11. The method of claim 8, wherein the DPU comprises at least one smart network interface card, the at least one smart network interface card comprising an additional CPU that can execute a storage task or a networking task on behalf of the CPU of the computing device.

12. The method of claim 8, wherein causing the DPU to install the second hypervisor comprises:

initiating communication with the DPU via a baseboard management controller (BMC); and providing the DPU boot image to the DPU via the BMC.

13. The method of claim 12, further comprising:

monitoring a status an installation of the second hypervisor via one or more status updates received from the BMC.

14. At least one non-transitory, computer-readable medium comprising machine readable instructions that, when executed by a central processing unit (CPU) of a computing device, cause the computing device perform operations comprising:

obtaining, by the computing device, a first boot image comprising first installation data for configuring a first hypervisor on the computing device and second installation data for configuring a second hypervisor on the DPU;

identifying, by the computing device and from the second installation data, one or more files associated with the second hypervisor to be installed on the DPU;

creating, by the computing device, a second boot image based at least in part on the one or more files and an image format, the second boot image being a DPU boot image; and causing, by the computing device, the DPU to install the second hypervisor on the DPU using the DPU boot image.

15. The computer readable medium of claim 14, the operations further comprising:

executing an installation workflow, based at least in part on the first installation data in the first boot image, to install the first hypervisor on the computing device.

16. The computer readable medium of claim 14, the operations further comprising:

converting the one or more files into the DPU boot image having the image format by using a packaging kit.

17. The computer readable medium of claim 14, wherein the DPU comprises at least one smart network interface card, the at least one smart network interface card comprising an additional CPU that can execute a storage task or a networking task on behalf of the CPU of the computing device.

18. The computer readable medium of claim 14, wherein causing the DPU to install the second hypervisor comprises:

initiating communication with the DPU via a baseboard management controller (BMC); and providing the DPU boot image to the DPU via the BMC.

19. The computer readable medium of claim 18, the operations further comprising:

monitoring a status an installation of the second hypervisor via one or more status updates received from the BMC.

20. The computer readable medium of claim 14, the operations further comprising:

receiving configuration data associated with installation of the second hypervisor, the DPU boot image being embedded with the configuration data.

* * * * *